United States Patent
Mitchell et al.

(10) Patent No.: US 7,350,104 B2
(45) Date of Patent: Mar. 25, 2008

(54) INVOCATION OF A FOLLOW ON UNIT OF WORK

(75) Inventors: Ian J. Mitchell, Eastleigh (GB); Steven Powell, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 554 days.

(21) Appl. No.: 10/972,934

(22) Filed: Oct. 25, 2004

(65) Prior Publication Data

US 2005/0091557 A1    Apr. 28, 2005

(51) Int. Cl.
*G06F 11/00* (2006.01)

(52) U.S. Cl. .......................................... 714/15; 718/106
(58) Field of Classification Search ................ 714/19, 714/2, 15
See application file for complete search history.

(56) References Cited

U.S. PATENT DOCUMENTS

| | | | | |
|---|---|---|---|---|
| 5,465,328 A | * | 11/1995 | Dievendorff et al. | 714/15 |
| 6,012,094 A | * | 1/2000 | Leymann et al. | 709/230 |
| 6,041,425 A | * | 3/2000 | Kokunishi et al. | 714/37 |
| 6,308,287 B1 | | 10/2001 | Mitchell | 714/19 |
| 6,574,750 B1 | * | 6/2003 | Felber et al. | 714/20 |
| 6,728,747 B1 | * | 4/2004 | Jenkins et al. | 718/101 |
| 6,961,865 B1 | * | 11/2005 | Ganesh et al. | 714/2 |
| 2005/0193286 A1 | * | 9/2005 | Thattle et al. | 714/48 |

* cited by examiner

*Primary Examiner*—Christopher McCarthy
(74) *Attorney, Agent, or Firm*—Hamilton & Terrile (57) ABSTRACT

The present invention provides a method, system, computer program product and service, by which a unit of work manager can reliably start a follow-on unit of work after a first unit of work, in the event the first unit of work backs out without requiring to interlock the execution of the first unit of work and follow on unit of work. If the first unit of work completes before the follow-on is started information written to non-volatile memory, written as part of the first unit of work, is used on recovery to start is follow-on unit of work if no other information exists in the volatile storage which indicates the follow-on unit of work has started.

12 Claims, 7 Drawing Sheets

INVOCATION OF A FOLLOW ON UNIT OF WORK

FIELD OF THE INVENTION

This invention relates to the field of transaction processing for data processing systems, and particularly to the invocation of a second unit of work in the event of a failure of a first unit of work.

BACKGROUND OF THE INVENTION

In the field of transaction processing, units of work are generally required to have what are known as the ACID properties. ACID is an acronym representing the four unit of work properties of: Atomicity, Consistency, Isolation and Durability. Atomicity requires that either all the operations of the unit of work must be seen to occur or none must be seen to occur. Consistency requires a unit of work to maintain the consistency of in the data on which it operates. Isolation requires a unit of work not to read the intermediate results of another transaction. Durability requires the results of a committed unit of work to be made permanent and that the other ACID attributes can be guaranteed even in the event of system failure. However the responsibility to ensure these properties falls to different components. For example, if the unit of work is a transaction, atomicity is provided by the transaction manager, consistency by the application, isolation and durability by a resource manager. Further in some units-of-work not all such properties are observed, for example, isolation is not observed for a unit of work which is a long running (extended) transaction and which comprises several transactions.

For example, a well known and understood unit of work is a transaction and it is the role of a transaction manager or middleware to provide atomicity. Thus, for example, if an application involves two operations in a transaction and then requests the transaction service to commit the transaction, the transaction service must ensure that both operations commit (succeed). Alternatively if the application requests the transaction service to back out the transaction, the transaction service must ensure that both operations are backed out (fail).

A major problem in providing atomicity is that it must be guaranteed even in the event of a failure of the system on which the transaction service is. For example, if a transaction involves two operations and then commits, the system might fail after the transaction service has committed the first operation but before the same has been done for the second operation. As a result when the system is restarted the transaction service must ensure that the second operation also commits. In order to provide this functionality it is necessary for the transaction service to maintain a non-volatile log which survives a system failure and which records the progress of each transaction. For example the transaction service will maintain in the log a sequential record of the operations involved in each transaction and the progressive states of the transaction. Further, at certain points in the transaction the transaction must be paused whilst the transaction service ensures that a log record has been written to non-volatile storage. For example, if a transaction service is based on presumed rollback, when a transaction is committed the transaction service must ensure that a "committing" record is logged to non-volatile storage (forced to disk) before any of the operations involved in the transaction are committed. This is because if the first operation is committed and the system fails before the "committing" record is stored in non-volatile storage, on recovery, in the absence of a committing record for the transaction, the transaction service will assume rollback and then rollback the second operation thus breaking the atomicity of the transaction. However, in the modern day of very high transaction rates, the forcing of log records to non-volatile storage is relatively time consuming and a transaction service therefore tries to keep such forces to an absolute minimum.

A common requirement in an application is to follow one transaction with another for example if a first transaction backs-out, to then run a follow-on transaction which can, for example, attempt in some way to compensate for the failure and/or to report the occurrence of the failure. One problem with such a requirement is that completion of the first transaction is used to trigger the start of the follow-on transaction and a problem can occur if a system failure happens between completion of the first transaction and the starting of the follow-on transaction. This is because, on recovery, the transaction service reads its log and recovers any incomplete transactions recorded in it. However in this scenario the first transaction is complete and the follow-on transaction is not in the log and as a result the requirement for it to run is lost.

IBM Patent U.S. Pat. No. 6,308,287 to IBM addresses this problem and discloses a solution in which: the back-out of the first transaction is interlocked with the start of the follow-on transaction such that the completion of the first transaction is not recorded in the log until after the existence of the follow on transaction is also recorded in the log; and "filed signals" are used to protect volatile in-memory signals which may be required during recovery. This way if a system failure happens after the completion of the first transaction, on recovery the transaction log will contain details of the follow-on transaction. However, this solution is not ideal because it requires much reprogramming of the transaction service in order to adopt the solution, and, further, it introduces additional forced log writes related to follow on transactions which introduce reduced performance in the processing of transactions.

SUMMARY OF THE INVENTION

Accordingly, according to a first aspect the present invention provides a data processing method for a unit of work manager in a data processing system to provide assured execution of a second unit of work after failure of a first unit of work, the method comprising the steps of: obtaining details of a second unit of work to be run in the event that a first unit of work fails; during execution of the first unit of work, storing first information in non-volatile storage wherein the first information indicates a requirement to run the second unit of work in the event that the first unit of work fails; completing the first unit of work wherein the first unit of work fails; and starting the second unit of work independently of completing the first unit of work; wherein, in the event of a system failure which occurs after completing the first unit of work, the first information can be used to start the second unit of work on system recovery.

According to a second aspect the present invention provides a data processing system for providing assured execution of a second unit of work after failure of a first unit of work, the system comprising: means for obtaining details of a second unit of work to be run in the event that a first unit of work fails; means for, during execution of the first unit of work, storing first information in non-volatile storage wherein the first information indicates a requirement to run the second unit of work in the event that the first unit of work fails; means for completing the first unit of work wherein the first unit of work fails; and means for starting the second unit of work independently of completing the first unit of work; wherein, in the event of a system failure which occurs after completing the first unit of work, the first information can be used to start the second unit of work on system recovery.

According to a third aspect the present invention provides a computer program product comprising instructions which, when executed on a data processing host, cause the data processing host to carry out a method according to the first aspect.

According to a fourth aspect the present invention provides a unit of work manager service, of a data processing system, for providing assured execution of a second unit of work after failure of a first unit of work, providing the service comprising carrying out a method according to the first aspect.

As a result of the second unit of work being started independently of the completion of the first unit of work, optionally the second unit of work can be started after completion of the first unit of work.

Preferably during execution of the second unit of work second information is stored, in non-volatile storage, which indicates that the second unit of work has started. The second information may then be used to restart the second unit of work on recovery after a system failure if the second unit of work does not complete, and this discharges a need to maintain the first information in non-volatile storage, for example during a keypoint operation. Advantageously the storing of the second unit of work need not be a forced write to non-volatile storage, thereby reducing the performance impact associated with a write of such information.

Optionally the unit of work manager is capable of taking a keypoint in which all active units of work rewrite information to non-volatile memory and all information written to non-volatile memory prior to the keypoint is made redundant. In this case, if a keypoint is taken after the first unit of work completes, during a keypoint the unit of work manager writes third information to non-volatile storage wherein the third information indicates a requirement to run the second unit of work. This means that the first information becomes redundant.

According to a fifth aspect the present invention provides a data processing method for a unit of work manager to recover after a system failure, the method comprising the steps: reading from non-volatile memory information relating to units of work which were started prior to the system failure; and responsive to reading first information which indicates a requirement to run the second unit of work in the event that the first unit of work fails and reading information which indicates that the first unit of work failed, processing the first information comprising the step:

starting the second unit of work.

According to a sixth aspect the present invention provides a data processing system for recovery after a system failure, the system comprising: means for reading from non-volatile memory information relating to units of work which were started prior to the system failure; means, responsive to reading first information which indicates a requirement to run the second unit of work in the event that the first unit of work fails and reading information which indicates that the first unit of work failed, for processing the first information comprising: means for starting the second unit of work.

According to a seventh aspect the present invention provides a computer program product comprising instructions which, when executed on a data processing host, cause the data processing host to carry out a method according to the first aspect.

According to a eighth aspect the present invention provides a unit of work manager service, of a data processing system, for recovering after a system failure, providing the service comprising carrying out a method according the fifth aspect.

Optionally the non-volatile memory includes second information which indicates that the second unit of work was started. In this case, on reading such information, if further information which indicates that the second unit of work successfully completed has not previously been read, the presence of the second information is used to restart the second unit of work. Further the presence of the first information is not used to start the second unit of work.

Optionally the non-volatile memory includes third information, such as may have been written during a keypoint, which indicates a requirement to run the second unit of work. In this case on reading this information, if the second information has not previously been read, the presence of the third information is used to start the second unit of work.

Note that the first and second units of work could be elements of simple transactions, extended transactions, business processes, activity sessions, or sagas. For example, if the units of work is a transaction the unit of work manager will be a transaction manager and the non-volatile storage a transaction log. Alternatively the unit of work manager could be a synchpoint manager, as resource manager, a long running transaction manager, a workflow manager or a transactional-aware message queue manager.

Note that the second unit of work may perform a variety of functions, for example it can attempt in some way to compensate for the failure and/or to report the occurrence of the failure. Alternatively it could for example, perform an alternative function to that of the failing first unit of work.

Note that the first, second and third information can each be stored in one or more records in non-volatile storage and further each may contain either sufficient information to start the second unit of work or information which specifies a location at which sufficient information to start the second unit of work can be found.

Accordingly the present invention discloses how a unit of work manager can reliably start a follow on unit of work after a first unit of work, in the event the first unit of work backs out, in a way which, compared to the previous solution disclosed in U.S. Pat. No. 6,308,287: can be more easily implemented in, for example, a transaction manager; requires fewer forced log writes; and does not require the start of the follow on unit of work to be interlocked with the first unit of work.

BRIEF DESCRIPTION OF THE DRAWINGS

The invention will now be described, by way of example only, with reference to a preferred embodiment thereof, as illustrated in the accompanying drawings, in which.

Note, in the figures like numbers are used to denote like parts.

DESCRIPTION OF THE PREFERRED EMBODIMENT

Figure 1:
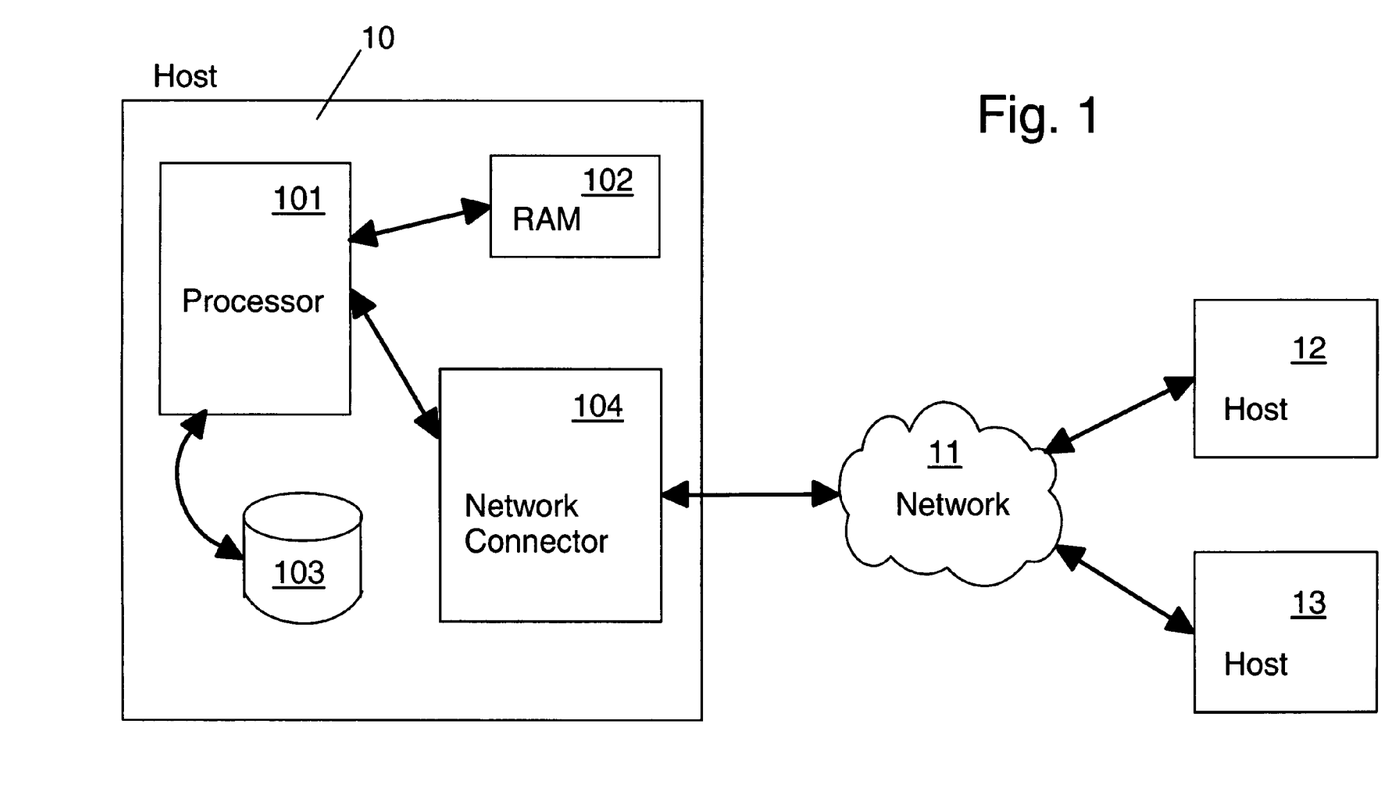
FIG. 1 is a block diagram of a data processing environment in which the preferred embodiment of the present invention can be advantageously applied.

FIG. 1 is a block diagram of a data processing environment in which the preferred embodiment of the present invention can be advantageously applied. In FIG. 1, a client/server data processing host 10 is connected to other client/server data processing host 12 and 13 via a network 11, which could be, for example, the Internet. An application which runs transactions, a Transaction Manager (e.g.: IBM® CICS®) and a Database Manager (e.g.: IBM DB2®), for the purpose of executing transactions, may be installed on any such client/server and any may be on the same client/server as any other. Client/server 10 has a processor 101 for executing programs that control the operation of the client/server 10, a RAM volatile memory element 102, a non-volatile memory 103, and a network connector 104 for use in interfacing with the network 11 for communication with the other client/servers 12 and 13. (IBM, CICS and DB2 are registered trademarks of International Business Machines Corporation in the United States, other countries, or both).

Figure 2:
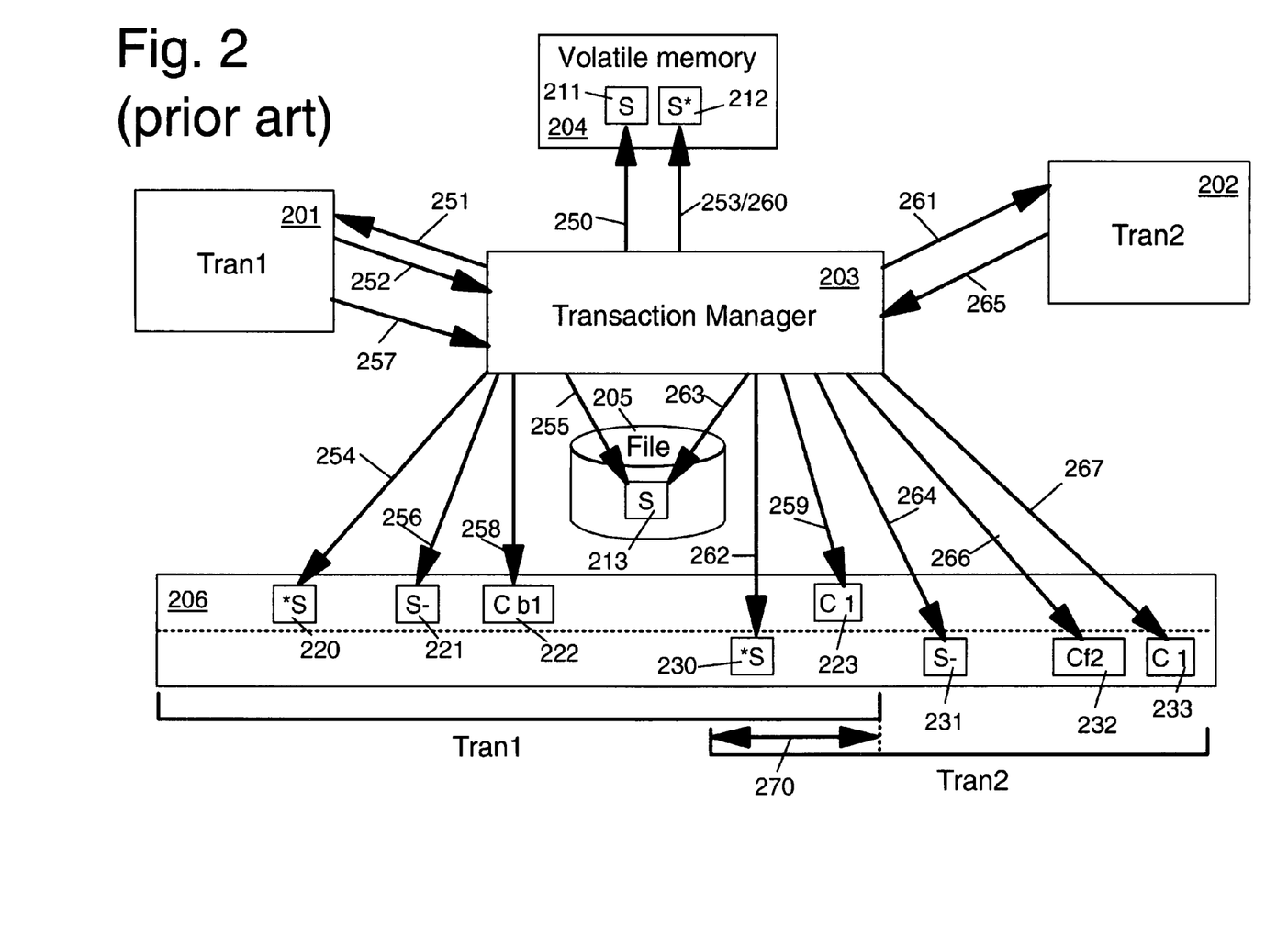
FIG. 2 is a schematic diagram of the components involved in running a transaction which requires a follow on transaction, and the flows between those components, according to prior art U.S. Pat. No. 6,308,287.
Figure 3:
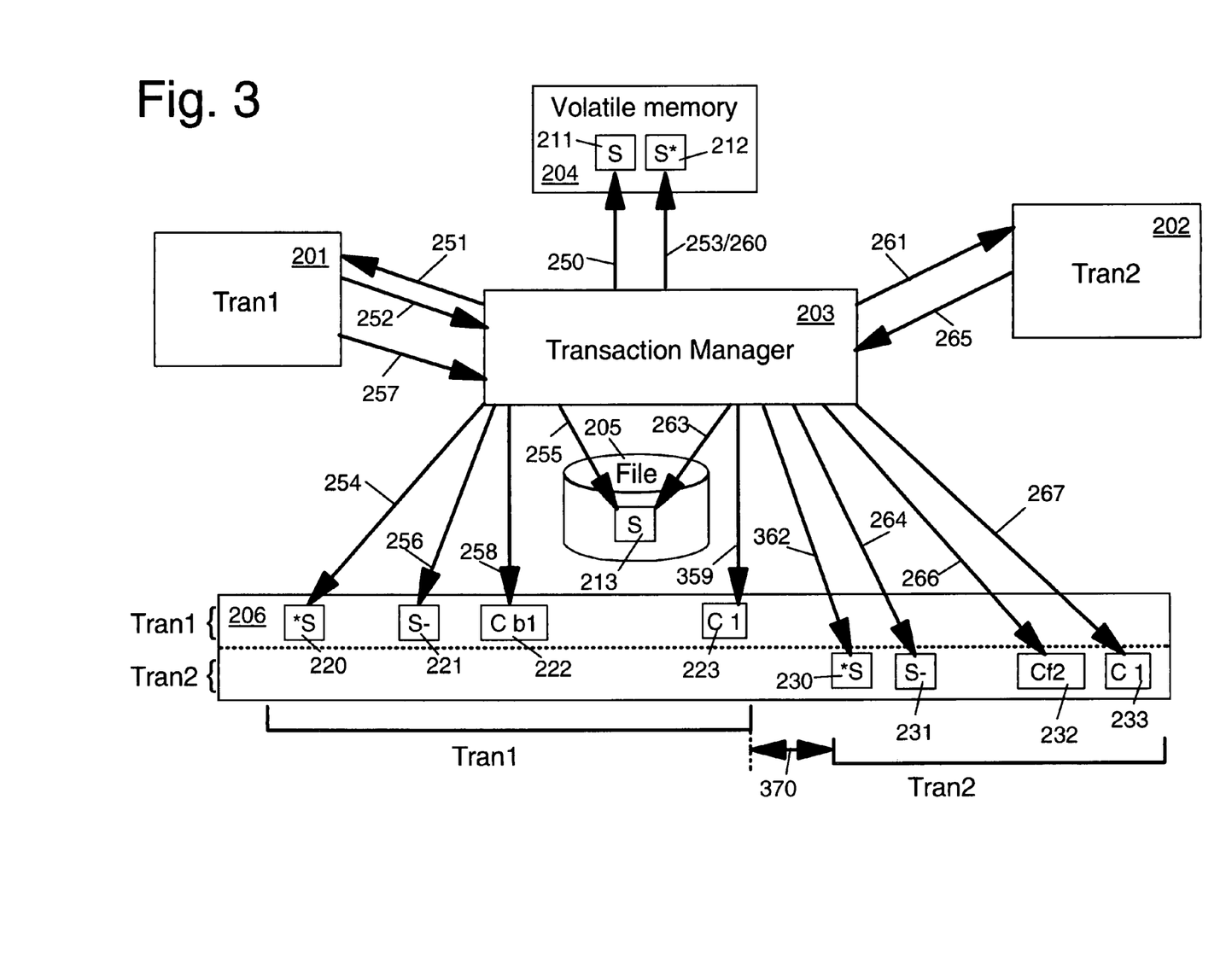
FIG. 3 is a schematic diagram of the components involved in running a transaction which requires a follow on transaction, and the flows between those components, according to the preferred embodiment of the present invention.

FIGS. 2 and 3 are schematic diagrams of the solution proposed in prior art U.S. Pat. No. 6,308,287 and the preferred embodiment of the present invention, respectively, for ensuring that, in the event of a first transaction failing, the requirement to run a follow on (failure) transaction for the failing first transaction is not lost. Accordingly in the preferred embodiment the chosen unit of work is a transaction, the unit of work manager is a transaction manager and the non-volatile memory is a transaction log.

Note that figures show a transaction log 206 and records which are written to it, by a transaction manager, in time order from left to right. The transaction log is kept in non-volatile memory, such as a hard disk, so that it is not lost in the event of a system failure. Note that, although not shown in the diagrams, any data written to the transaction log as part of a transaction is also retained separately in volatile memory until that transaction completes. Accordingly the transaction log is maintained so that in the event of a system failure, such that all of the data in volatile memory is lost, the transaction manager, on recovery, has sufficient information available in non volatile memory to complete any transactions which were active when the failure occurred. Further note that records can be either written or force written to the transaction log. If a record is written it is potentially buffered in volatile memory for later hardening to non volatile memory by a component providing access to the non-volatile memory, for example hard disk drive software. As a result a write request may return whilst the record is still buffered in volatile memory which means that the act of writing a record does not guarantee the record will be available in the event of system failure. However force writing a record means that the force write request will not return until the record has been hardened to non-volatile memory, and so guarantees that the record is available in the event of system failure. Further a force write of a record will ensure that all previously written records which are still buffered in volatile memory are hardened to non-volatile memory. Note that, in performance terms writes are relatively quick and force writes are relatively slow, and as a result in a transaction system where performance is highly important it is a goal to force write as few records to the transaction log as possible.

The figures also show a file 205 which also represents non-volatile memory and accordingly may also contain information which is available to the transaction manager following a system failure.

FIG. 2 assumes that a preliminary transaction which specified the requirement to run a subsequent (first) transaction, Tran1 201, has successfully completed and as a result the Transaction Manager 203 has stored a signal 211 in volatile memory 204, and a copy of that signal 213 in a recoverable file 205, where the signal records the requirement to run Tran1. To start Tran1 the Transaction Manager 203 reads (250) signal 211 from volatile memory and as a result attaches and starts (251) Tran1 201. Tran1 then issues a protect request (252) to indicate that in the event of its failure a follow on (failure) transaction, Tran2 202, should be run, for example to clean up signal 213 in the file 205 and record the failure of Tran1. As a result of this protect request the transaction manager saves (253) a modified signal 212 in volatile memory and writes (254) first information, in the form of a record 220 comprising a copy of the signal, to the transaction log 206, the signal recording details of the requirement to run Tran2 202 in the event that Tran1 fails. Note that for clarity purposes the records written to the transaction log are shown either above or below a dotted line, those records above the dotted line being associated with Tran1 and those records below the dotted line being associated with Tran2. Next, as part of processing Tran1, the signal 211 is deleted (255) from the file 205 and as a result a record 221 is written (256) to the transaction log recording deletion of the signal, such deletion only completing if Tran1 commits forward. The processing of Tran1 then subsequently fails and Tran1 requests (257) the Transaction Manager to backout the transaction. As a result of this request the requirement to run Tran2 is confirmed. In order to backout the transaction the Transaction Manager first recoverably logs (force writes) (258) a commit backwards record 222 to the transaction log file 206, and then suspends Tran1, effectively deferring the backout processing of Tran1. At this stage, if the system should fail, thus losing the signals (211, 212) from volatile memory 204, the requirement to run the follow on transaction would not be lost because it is recorded in the transaction log in the form of log records (220 and 222) which are associated with Tran1 which is incomplete.

Whilst Tran1 is suspended the transaction manager starts Tran2 202 by first reading (260) signal 212 from volatile memory 204, and information from the signal 211 is then used to attach and start (261) Tran2 202. The transaction manager then recoverably logs (force writes) (262) a record (230) which is a copy of the signal 212 held in volatile memory and indicates that the follow on transaction has started. At this point should the system fail the requirement to run the follow on transaction is now also recorded in the transaction log and associated with an incomplete transaction (i.e.: Tran2) and therefore would not be lost even if Tran1 was completed and the signals 211 and 212 in volatile memory lost. As a result the transaction manager now resumes backout processing of Tran1 to allow it to complete and finally, when it is complete, writes (259) a completion record (223) to the transaction log 206 to indicate that Tran1 202 is complete. Note that as a result of suspending Tran1 there is a time period (270) when both Tran1 and Tran2 are active. Further note that as a result of Tran1 backing out the deletion of the signal 213 from file 205 is not completed and the signal remains on the file.

Meanwhile Tran2 202 continues by deleting (263) signal 213 from file 205 and as a result the transaction manager writes (264) a record 231 to the transaction log file 206. Sometime later Tran2 requests (265) the transaction manager to commit the transaction and as a result the transaction manager recoverably logs (force writes) (266) a commit forwards record 232 to the transaction log, commits the transaction thus confirming deletion of the signal 213 from file 203, and finally writes (268) a completion record for Tran2 to the transaction log.

Note that, as a result of the sequence of events described with reference to FIG. 2, the information in the transaction log 206 is always sufficient to ensure that Tran2 is started in the event of Tran1 failing, and further that it is started only once. Tran1 is held after writing the commit backward record 222 such that the completion record 223 is not written until the requirement to run the transaction is recoverably stored in the log by the force write (262) of log record 230. Note that if Tran1 was allowed to complete before this is done and there was a failure before record 230 was force written to the log, such that signals 211 and 212 were lost from volatile memory, then on recovery the Transaction Manager would read the log file in order to decide on what recovery action should be taken and ignore log record 220 as it was written as part of Tran1 which is complete.

According to the present invention the requirement to run a failure transaction can be reliably achieved without requiring to suspend the failing transaction whilst the failure transaction is started. For example with reference to FIG. 2, assured once and once only execution of Tran2 in the event of Tran1 failing is achieved without requiring both transactions to be active for time period 270.

FIG. 3 is a schematic diagram of the preferred embodiment of the present invention and has much in common with FIG. 2, and accordingly like numbers are used for like parts. In FIG. 3 it can be seen, by comparison with FIG. 2, that the flows shown between the Tran1 201, Tran2 202, Transaction Manager 203, Volatile Memory 204, and File 205 are the same as shown for FIG. 2 and as a result these are not described again. The differences between FIGS. 2 and 3 occur in the timing of some of the flows which result in a change to the order in which some records are written to the log, and accordingly the description of FIG. 3 will be limited to these differences.

The first difference occurs after the request (257) to backout from Tran1 201 to the Transaction Manager 203 and the transaction manager force writes (258) a commit backwards record 222 to the transaction log. At this point in FIG. 2 Tran1 was suspended whilst Tran2 was started, but now Tran1 is allowed to run to completion resulting in the transaction manager writing (359) a completion record 223 to the transaction log file 206.

The second difference is that the transaction manager 203 starts Tran2 202 independently of Tran1 and so this may be done whilst Tran1 is still active or after it has completed. In the figure after Tran1 completes, Tran2 is started and run in the same way as before by reading (260) the modified signal 212 from memory and using it to attach and start (261) Tran2 202. However, whereas in FIG. 2 the transaction manager force writes record 230 to the transaction log, in the preferred embodiment this force is not necessary and as a result the transaction manager writes (362) second information, in the form of a record comprising a copy of the modified signal 230, to the transaction log, the modified signal indicating that the second unit of work has started. The remainder of the processing for Tran2 is then the same as for FIG. 2.

Figure 4:
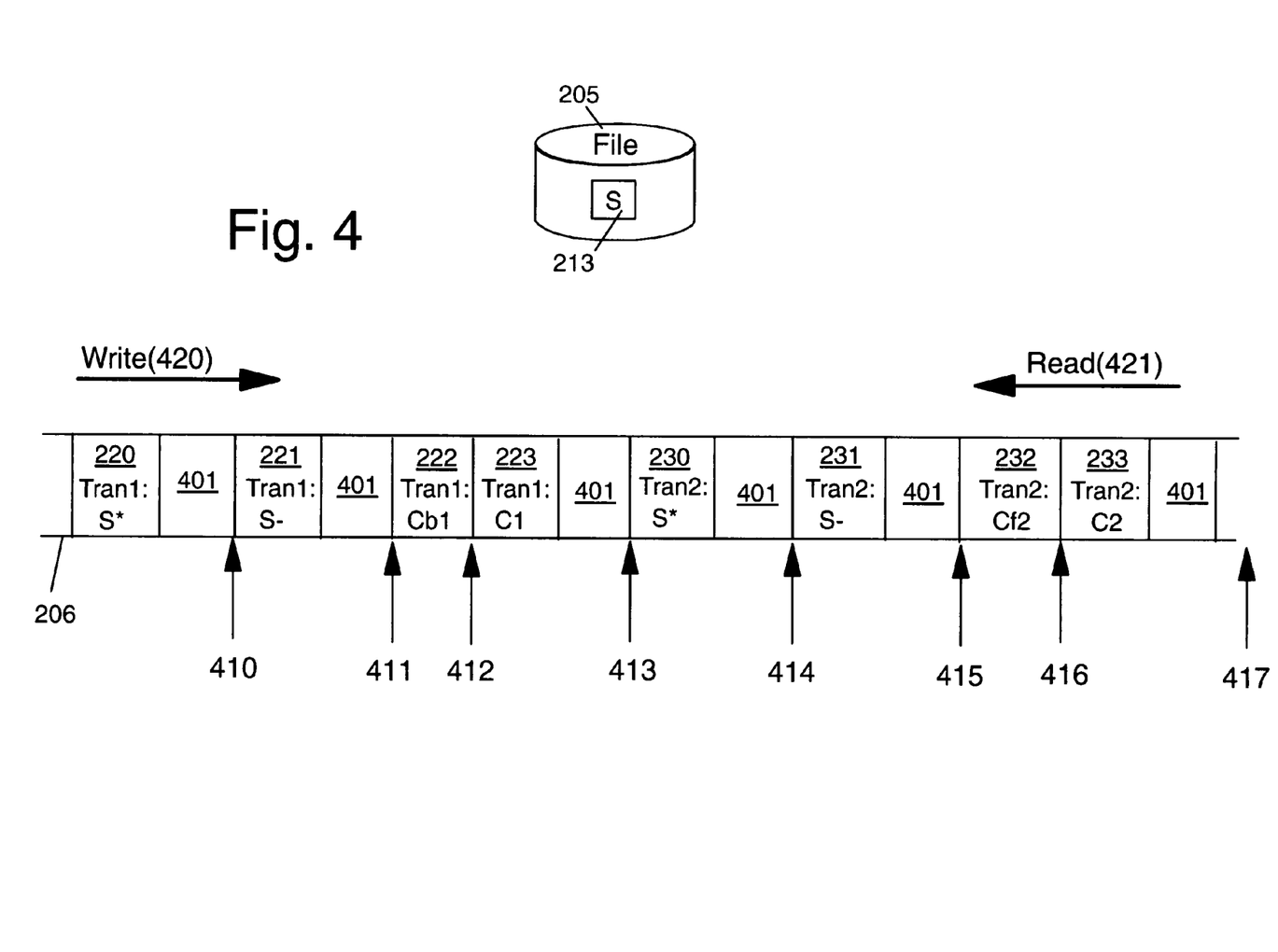
FIG. 4 is a schematic diagram of the transaction log contents according to the preferred embodiment of the present invention.

Accordingly, in the preferred embodiment of the present invention, the order of the contents of the transaction log 206 in FIG. 3 is different from that in the prior art of FIG. 2. A schematic diagram of the information which may be available to the transaction manager in the event of system failure, as a result of the flows in FIG. 3, is shown in FIG. 4. Such information comprises the contents of the transaction log 206 and file 205. Also shown in the transaction log are additional data 401 which represent records written by other transactions running at the same time as Tran1 and Tran2 and may contain records which were force written. Note that records are written to the log, during normal processing, in the direction shown by arrow 420, and records are read from the log, during recovery, in the reverse direction shown by arrow 421. Further shown in FIG. 4 are arrows (410-417) which indicate where it is possible for the contents of the log to stop (i.e.: the contents are those to the left of the arrow) if a system failure occurred at various points in the flows of FIG. 3. Note that a record which is not force-written (i.e.: records 220, 221, 223, 230, 231 and 233) will only be present in the transaction log on recovery if it is followed by a force written record, for example records 222, 223 or a force written record contained in a data 401. It is for this reason, for example, that it is possible that the contents of the log would stop at the point indicated by arrow 410 although record 220 was not force-written.

The recovery sequence at each of points 410 to 417, based on the transaction log contents being that to the left of an arrow, would be as follows:

410: record 220 indicates the requirement to run Tran2 in the event that Tran1 fails. However there is no record on the log of Tran1 failing and so the record is ignored. Further as there is no record of a decision for Tran1 (i.e.: a commit forwards or commit backwards record) the signal 213 in file 205 can be used to restart Tran1.

411: record 221 indicates that Tran1 attempted to delete signal 213 in file 205 but there is no record of a decision for Tran1 in the log, as a result the update to file 205 is backed out on recovery and as a result signal 213 remains in file 205. The processing of record 220 is the same as for 410.

412: record 222 indicates that a decision was made to commit backwards Tran1. The transaction manger will follow this decision and backout any updates made as part of the transaction. In this case an update is shown in record 221 and so the update to file 205 is backed out so that signal 213 remains on file 205. Record 220 records the requirement to start Tran2 in the event of Tran1 failing and this can now be honoured because Tran1 reached a backout decision. Accordingly the transaction manager uses the information in record 220 to subsequently start Tran2 and ignores the signal 213 which remains in file 205.

413: record 223 indicates that Tran1 has completed and according to the prior art this would result in record 220 being ignored. However according to the present invention the records of Tran1 are processed during recovery to see if a follow on transaction is required. In this case a follow on transaction is required which is indicated by the commit backwards record 222 and record 220 which indicates that Tran2 should be run in the event that Tran1 fails.

Accordingly the transaction manager uses the information in record 220 to subsequently start Tran2 and ignores the signal 213 which remains in file 205.

414: record 230 indicates that a follow on transaction, Tran2, was started but not finished. As a result the transaction manager uses information in record 230 to subsequently start Tran2 and ignores the signal in file 205 and the requirement to run Tran2 based on records 222 and 220.

415: record 231 indicates that Tran1 attempted to delete signal 213 in file 205 but there is no record of a decision for Tran2 in the log, as a result the update to file 205 is backed out and as a result signal 213 remains on file 205. The processing of the remaining records is the same as for 414.

416: record 232 indicates that a decision was made to commit forwards Tran2. The transaction manger will follow this decision and complete any updates made as part of the transaction. In this case an update is shown in record 321 and so the update to file 205 is committed and signal 213 is deleted from file 205. Records 230 and 220 which register the requirement to run Tran2 are ignored as Tran2 has now been completed.

417: record 233 indicates that follow on transaction, Tran2, completed and accordingly records 230 and 220 which register the requirement to run Tran2 are ignored as Tran2 has now been completed.

Thus it can be seen according to the preferred embodiment of the present invention the running of a failure transaction is assured in the event of system failure without the need to start the failure transaction, Tran2, before the follow-on transaction completes.

However it is common in transaction processing to keypoint the transaction log. For example, in simplistic terms, during a keypoint first a record is written to the transaction log which identifies the start of a keypoint, then all data of currently active transactions is rewritten to the transaction log, and finally a record which identifies the end of the keypoint is written to the transaction log. As a result of this operation the transaction log can be truncated to remove all log records written before the keypoint start record. For example, if a transaction system runs Transactions X, Y and Z, log records will be written to the log for all transactions. Then if after X and Y complete a keypoint is taken Z is the only active transaction. As a result Z will rewrite its records as part of the keypoint and the portion of the transaction log before the keypoint, containing records for X, Y and Z can be deleted. In such a system, for example with reference to FIG. 4, if a keypoint was taken at point 413 and the system failed before point 414 the requirement to run Tran2 would be lost because Tran1 would not rewrite records during keypoint as it is no longer active. Accordingly, according to the preferred embodiment of the present invention the transaction manager, for a complete transaction with a requirement to run a failure transaction, writes third information to the transaction log during keypoint. The third information is in the form of a record comprising information which includes the requirement to run the failure transaction, and ensures that this requirement to run the failure transaction is not lost.

Figure 5:
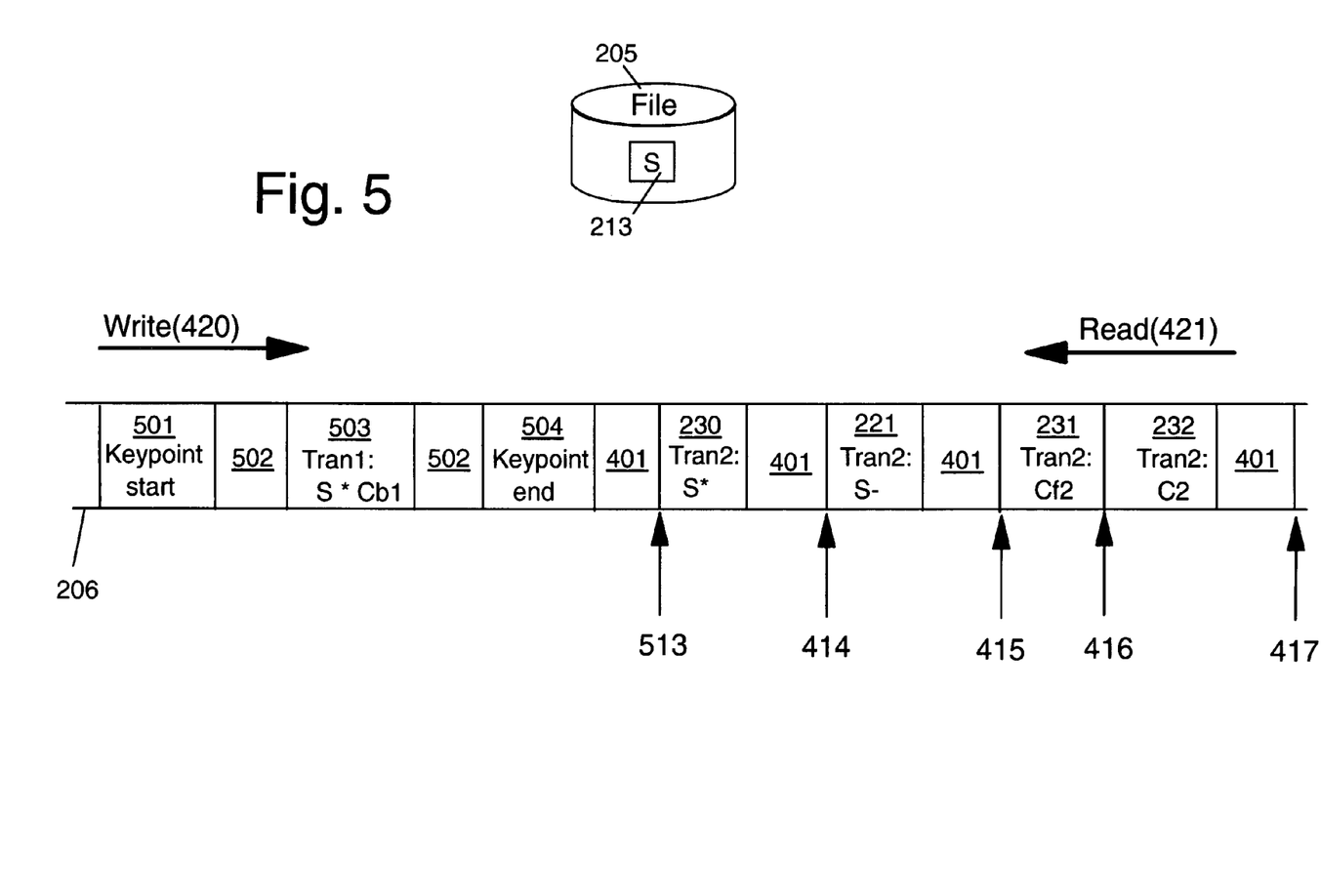
FIG. 5 is a schematic diagram of the transaction log contents following a keypoint according to the preferred embodiment of the present invention.

The possible contents of the transaction log including a keypoint, after Tran1 completes but before the presence of Tran2 is hardened to non-volatile storage by record 230, according to the preferred embodiment of the present invention is shown schematically in FIG. 5. The figure shows a keypoint start record 501, data 502 which may contain records of other transactions written as part of the keypoint, record 503 which records the fact the Tran1 failed and requires Tran2 to be run, more data 502, and a keypoint end record 504. This introduces a new point at which the transaction log could stop shown by arrow 513. Note that if a system failure occurred during the keypoint the transaction log would still contain all records associated with Tran2 and processing would be the same as for FIG. 4.

The recovery sequence at point 513, based on the transaction log contents being that to the left of the arrow, would be as follows:

513: record 503 indicates that Tran1 completed and had a requirement to be followed by Tran2, and the absence of a record indicating that Tran2 was started indicates that this requirement was not met. As a result the transaction manager will subsequently start Tran2, and the signal 213 in file 205 is ignored.

Note that the processing at points 414 to 417 is the same as for FIG. 4, although records 220 and 222 will not be present on the log as they have been replaced by record 503 which will be ignored. Further note that in this embodiment once Tran1 completes the requirement for Tran2 to be started is maintained in volatile memory such that it can be written during keypoint. This can then be deleted once record 231 noting the decision to commit forwards Tran2 has been force written to the log as this ensures that record 230 is available during recovery and can be used as an indication that Tran2 must be started, thus removing the need for record 503.

Figure 6:
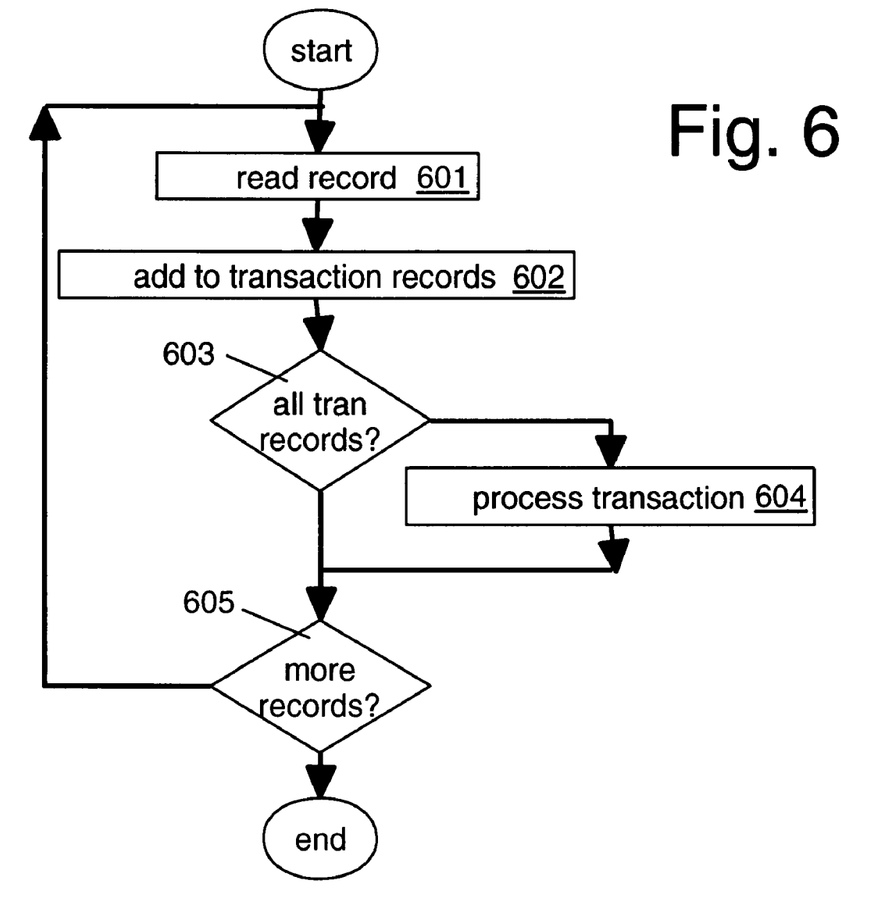
FIGS. 6 and 7 are flow diagrams of the method of processing a transaction log file during recovery according to the preferred embodiment of the present invention.
Figure 7:
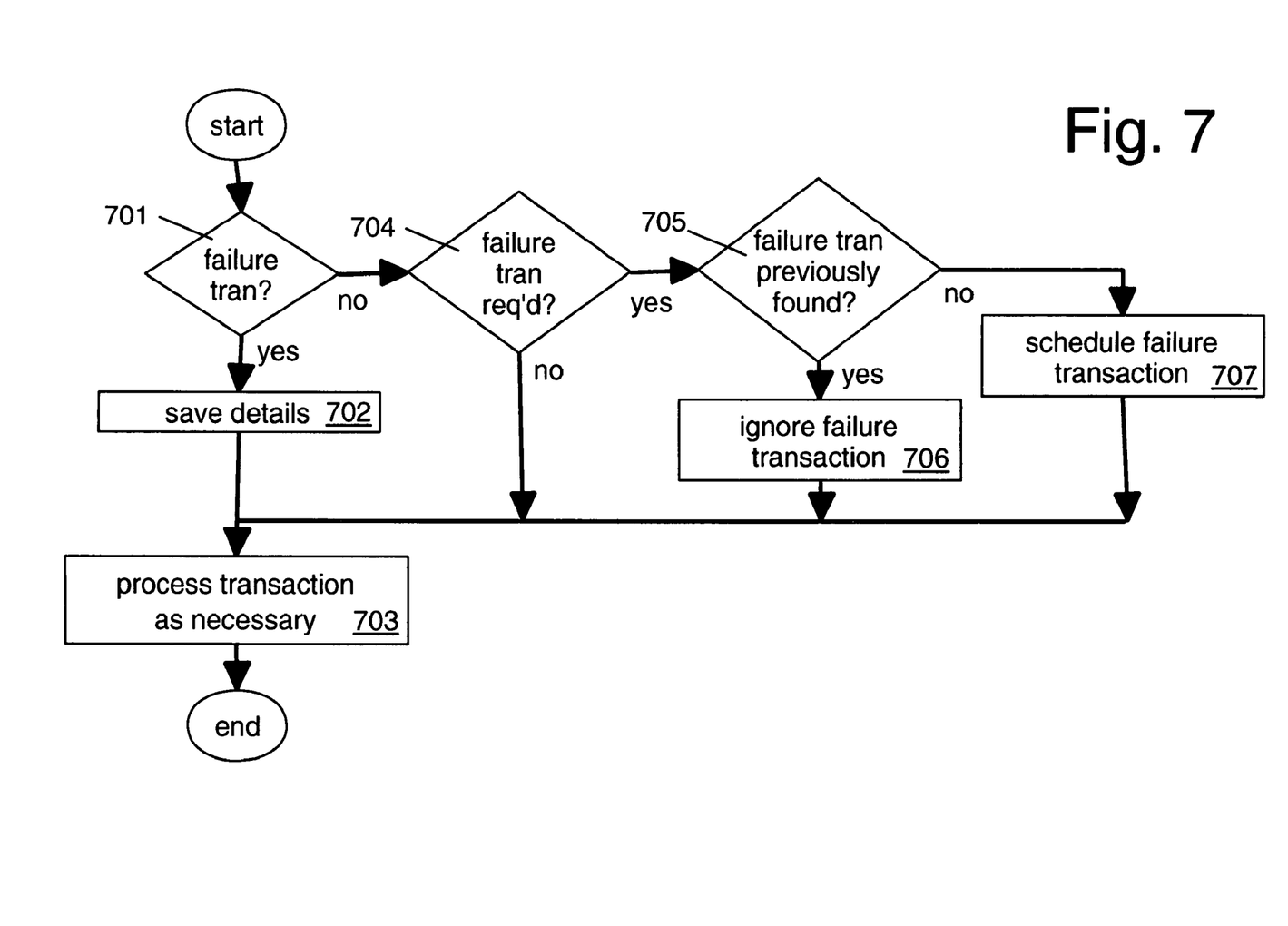

FIGS. 6 and 7 show the method, according to the preferred embodiment of the present invention, of processing the log during recovery based on reading the log backwards (i.e.: reading the most recently written record first).

In FIG. 6 at step 601 a record is read from the transaction log and at step 602 the transaction with which it is associated is found and the record read is associated with any previously read records for the same transaction. At step 603 a check is made to see if all records for a transaction have been read, for example because a transaction start record has been read. If all records for the transaction have been read the transaction is processed at step 604. Whether or not the transaction was processed at step 604, a check is made to see if all records have been read at step 605 and if not processing returns to step 601. For example all records will have been read if the end of the transaction log is reached or a keypoint start indication was found subsequent to a keypoint end indication. Note in another embodiment the entire log contents could be read before processing any transactions at step 604.

FIG. 7 is an expansion of step 604 of FIG. 6 and shows the method steps involved in processing the log records of a transaction. At step 701 a check is made to see if the transaction is a failure transaction, such as Tran2. If it is a failure transaction its details are saved in memory at step 702 and the transaction is processed, as necessary at step 703. If the transaction is not a failure transaction, at step 704 a check is made to see if the transaction requires a failure transaction to be run, such as may be indicated for example by log records 220 and 222 of FIG. 4. If a failure transaction is not required the transaction is processed as necessary at step 703. If a failure transaction is required at step 705 a check is made to see if details of the failure transaction were previously found (i.e.: saved at step 702). If details of the previous transaction were previously found the requirement is ignored as it will be processed according to the previously found details, and the transaction is then processed as necessary at step 703. If details of the failure transaction were not previously found the requirement to run the failure transaction is honoured at step 707 by scheduling the failure transaction, and then the transaction is processed as necessary at step 703. Note that processing the transaction as necessary at step 703 is based on standard transaction processing and according to FIGS. 4 and 5.

Note that in the preferred embodiment of the present invention Tran1 and Tran2 are examples of relatively simple transactions and in another embodiment could be more complex, for example involving updates to one or more resources such as data in a database. Further, because of the simplicity of Tran1 and Tran2 involving just one resource (the signal 213 in file 205) the commit protocol illustrated is one-phase commit. However, in practice, a transaction is likely to be more complex involving more than one resource and as a result follow a two-phase commit protocol. However, it would be well known to a person skilled in the art how to implement the invention for a two-phase commit transaction.

Further note that in the preferred embodiment of the present invention the failure transaction, Tran2 completes successfully (commits forwards). However, it is further possible that Tran2 could fail (commit backwards) in which case the log records of Tran2 would be processed in the same manner as the log records of Tran1 to ensure that Tran2 is restarted.

Further note that in the preferred embodiment of the present invention the requirement to run the first transaction is based on a signal 211 in volatile memory and a copy of the signal 213 in file 205. However the method of indicating the need to run transaction 201 is not relevant to the present invention, for example it could be based on a user request. Accordingly, if it is not based on use of a signal 213 in a file 205 neither Tran1 nor Tran2 would need to delete the signal from the file as part of their processing.

Further note that in the preferred embodiment Tran1 registers the requirement to run a failure transaction, Tran2, by issuing a protect request (252 of FIGS. 2 and 3) after it is started. In another embodiment this requirement could be registered in a different manner for example it could be part of configuration requirements for Tran1.

Note that a skilled person in the art would realise that the methods described with reference to FIGS. 3, 4, 5, 6 and 7 could be implemented in a variety of programming languages, for example, Java™, C, and C++ (Java is a registered trademark of Sun Microsystems, Inc. in the United States, other countries, or both.). Further a skilled person would realise that once implemented the methods can be stored in a computer program product comprising one or more programs, in source or executable form, on a media, such as floppy disk, CD, and DVD, suitable for loading onto a data processing host and causing the data processing host to carry out the methods. Further a skilled person would realise that the methods described with reference to FIGS. 3, 4, 5, 6 and 7 could be embodied in a data processing apparatus, and further used in providing a transaction recovery service.

Accordingly the present invention provides a method, system, computer program product and service, by which a unit of work manager can reliably start a follow-on unit of work after a first unit of work, in the event the first unit of work backs out without requiring to interlock the execution of the first unit of work and follow on unit of work. If the first unit of work completes before the follow-on is started information written to non-volatile memory, written as part of the first unit of work, is used on recovery to start is follow-on unit of work if no other information exists in the volatile storage which indicates the follow-on unit of work has started.

The invention claimed is:

1. A data processing method for a unit of work manager in a data processing system to provide assured execution of a second unit of work after failure of a first unit of work, the method comprising the steps of:
   obtaining details of a second unit of work to be run in the event that a first unit of work fails;
   during execution of the first unit of work, storing first information in non-volatile storage wherein the first information indicates a requirement to run the second unit of work in the event that the first unit of work fails;
   completing the first unit of work wherein the first unit of work fails; and
   starting the second unit of work;
      wherein the second unit of work is started independently of completing the first unit of work; and
      wherein, in the event of a system failure which occurs after completing the first unit of work, the first information can be used to start the second unit of work on system recovery.

2. The method of claim 1 wherein the first unit of work is completed before the second unit of work is started.

3. The method of claim 1 comprising the step of:
   during execution of the second unit of work, storing second information in non-volatile storage wherein the second information indicates that the second unit of work has started.

4. The method of claim 1 further comprising the step of:
   taking a keypoint, after the first unit of work completes, comprising the step:
      writing third information to non-volatile storage wherein the third information indicates a requirement to run the second unit of work.

5. A data processing method for a unit of work manager to recover after a system failure, the method comprising the steps:
   reading from non-volatile memory information relating to units of work which were started prior to the system failure;
   responsive to reading first information which indicates a requirement to run the second unit of work in the event that the first unit of work fails and reading information which indicates that the first unit of work failed, processing the first information comprising the step:
      starting the second unit of work; and,
   responsive to reading second information which indicates that the second unit of work was started and not previously reading information which indicates that the second unit of work successfully completed, restarting the second unit of work;
   wherein the step of starting the second unit of work is responsive to not previously reading the second information.

6. The method of claim 5 comprising further the step of:
   responsive to reading third information which indicates a requirement to run the second unit of work, processing the third information comprising the step:
      responsive to not previously reading the second information starting the second unit of work.

7. A data processing system for providing assured execution of a second unit of work after failure of a first unit of work, the system comprising:
- means for obtaining details of a second unit of work to be run in the event that a first unit of work fails;
- means for, during execution of the first unit of work, storing first information in non-volatile storage wherein the first information indicates a requirement to run the second unit of work in the event that the first unit of work fails;
- means for completing the first unit of work wherein the first unit of work fails; and
- means for starting the second unit of work;
    - wherein the means for starting the second unit of work can start the second unit of work independently of completing the first unit of work; and
    - wherein, in the event of a system failure which occurs after completing the first unit of work, the first information can be used to start the second unit of work on system recovery.

8. The system of claim 7 wherein the means for starting the second unit of work starts the second unit of work after the first unit of work completes.

9. The system of claim 8 further comprising:
- means for, during execution of the second unit of work, storing second information in non-volatile storage wherein the second information indicates that the second unit of work has been started.

10. The system of claim 7 further comprising means for taking a keypoint comprising:
- means for, after the first unit of work completes, writing third information to non-volatile storage wherein the third information indicates a requirement to run the second unit of work.

11. A data processing system for recovery after a system failure, the system comprising:
- means for reading from non-volatile memory information relating to units of work which were started prior to the system failure;
- means, responsive to reading first information which indicates a requirement to run the second unit of work in the event that the first unit of work fails and reading information which indicates that the first unit of work failed, for processing the first information comprising:
    - means for starting the second unit of work; and,
- means, responsive to reading second information which indicates that the second unit of work was started and not previously reading information which indicates that the second unit of work successfully completed, for restarting the second unit of work;
- wherein the means for starting the second unit of work is responsive to not previously reading the second information.

12. The system of claim 11 comprising further the step of:
- means, responsive to reading third information which indicates a requirement to run the second unit of work, for processing the third information comprising:
    - means, responsive to not previously reading the second information, for starting the second unit of work.

* * * * *